March 30, 1948.   E. M. O'NEILL   2,438,574
MIXING APPARATUS
Filed Aug. 24, 1942   8 Sheets-Sheet 1

INVENTOR
Edward M. O'Neill
BY John Flam
ATTORNEY

March 30, 1948.  E. M. O'NEILL  2,438,574
MIXING APPARATUS
Filed Aug. 24, 1942  8 Sheets-Sheet 2

INVENTOR
Edward M. O'Neill
BY John Flam
ATTORNEY

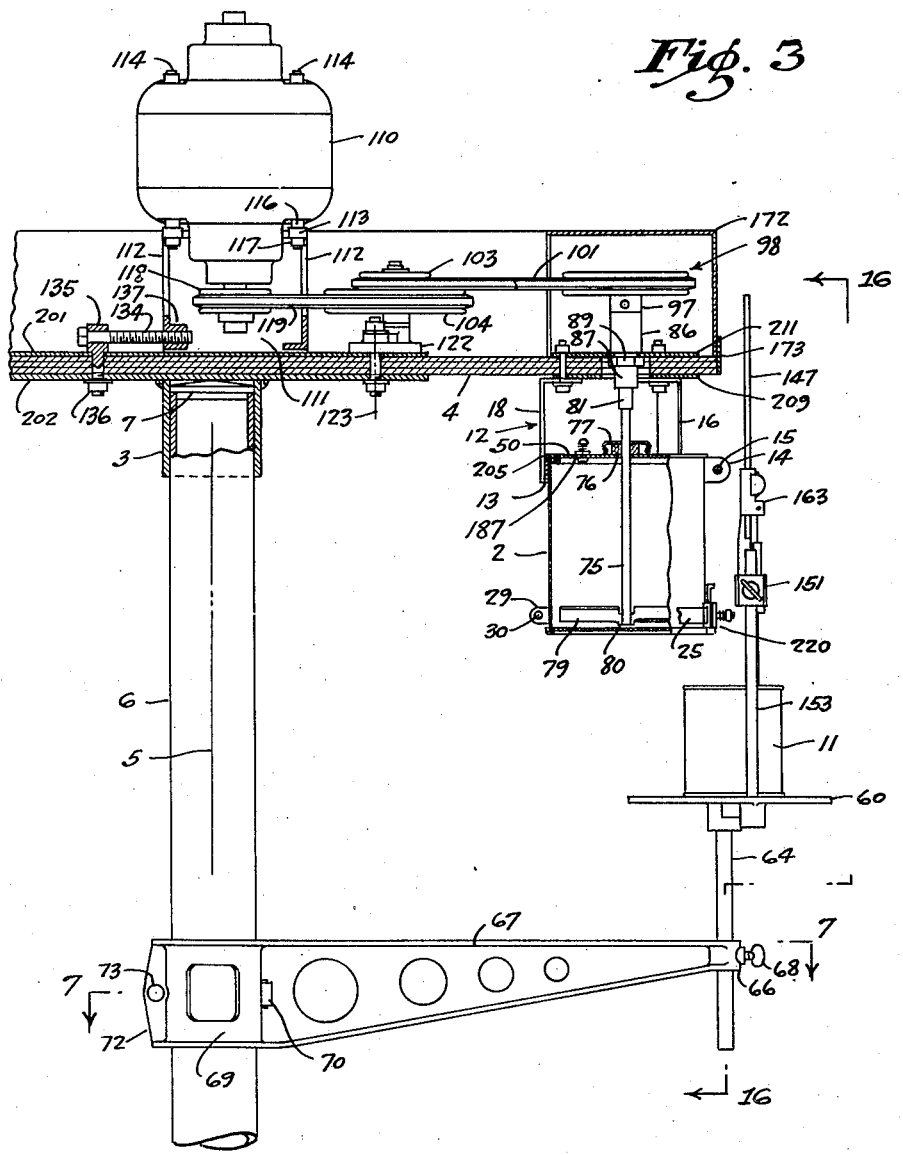

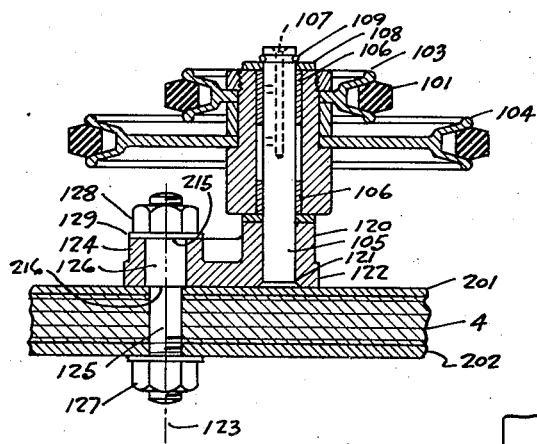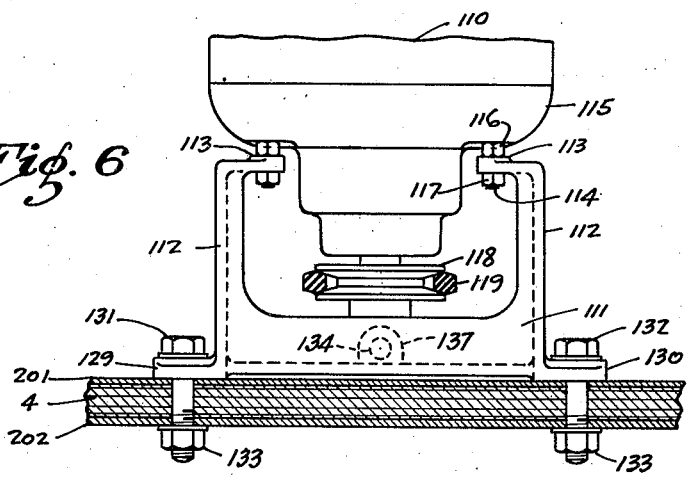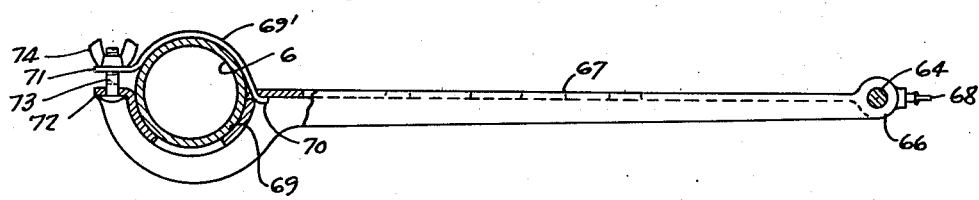

March 30, 1948. E. M. O'NEILL 2,438,574
MIXING APPARATUS
Filed Aug. 24, 1942 3 Sheets-Sheet 5
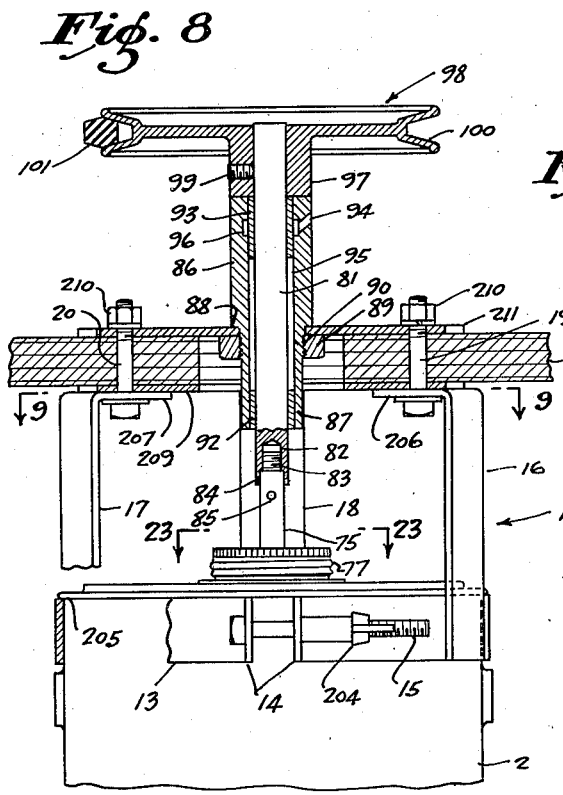
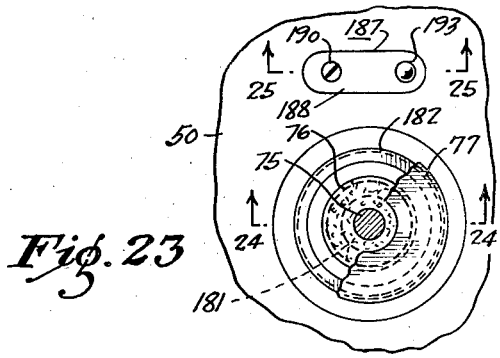
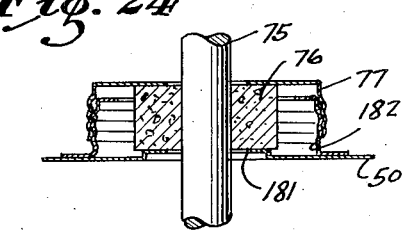
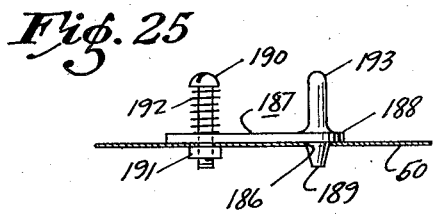
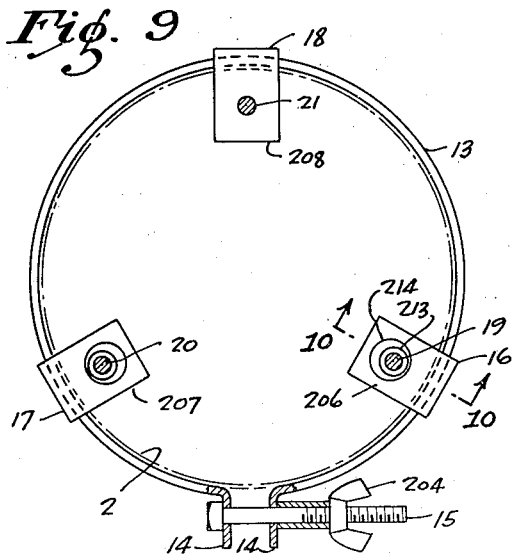
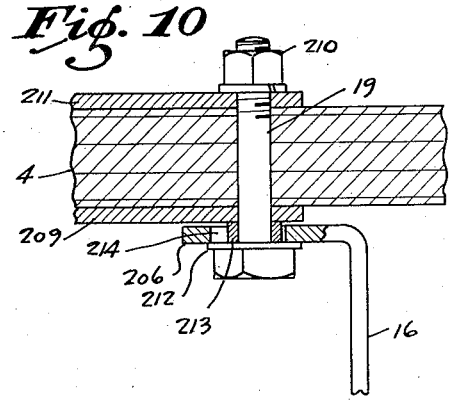
INVENTOR
Edward M. O'Neill
BY John Flam
ATTORNEY

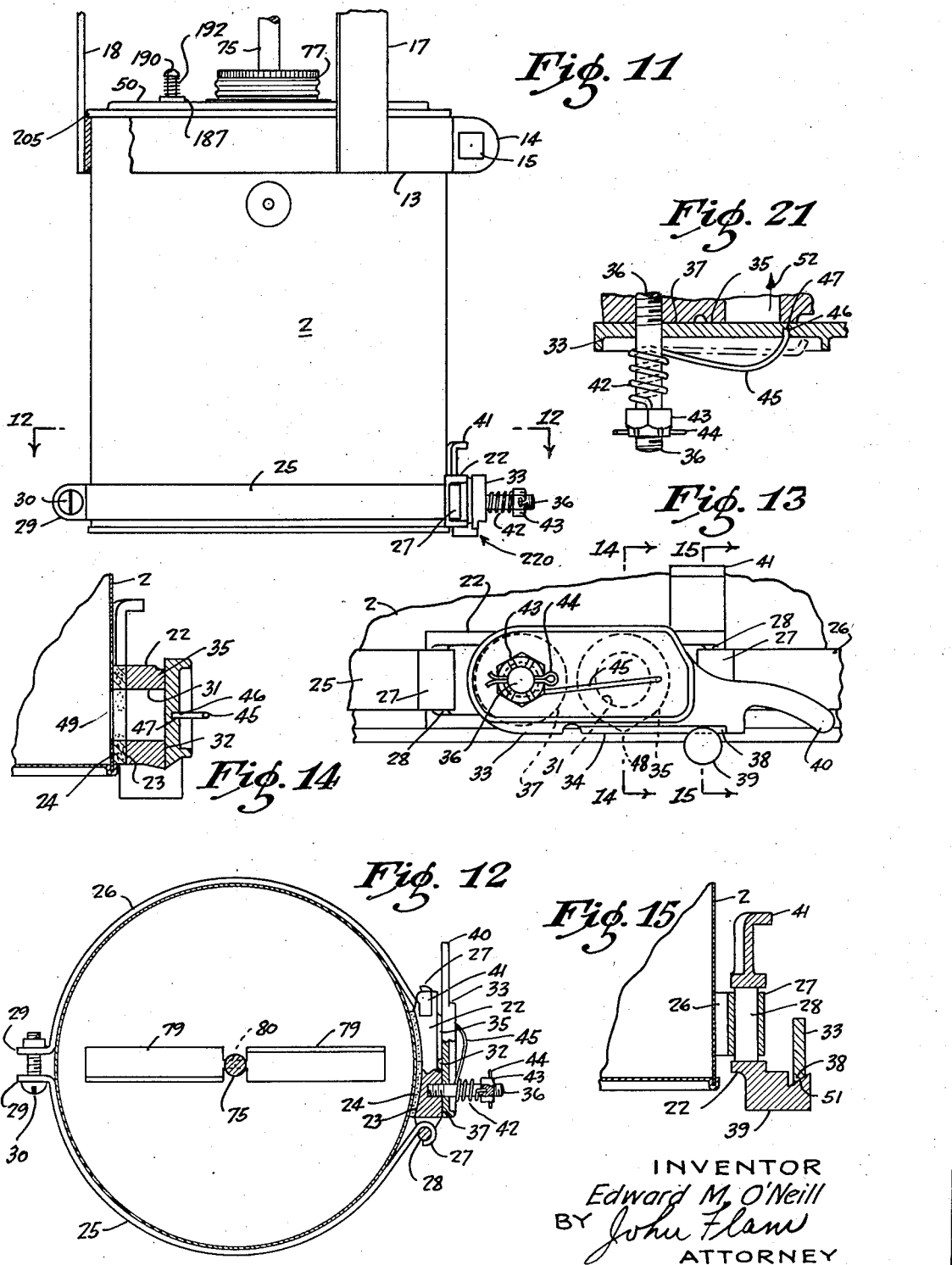

March 30, 1948. E. M. O'NEILL 2,438,574
MIXING APPARATUS
Filed Aug. 24, 1942 8 Sheets-Sheet 7
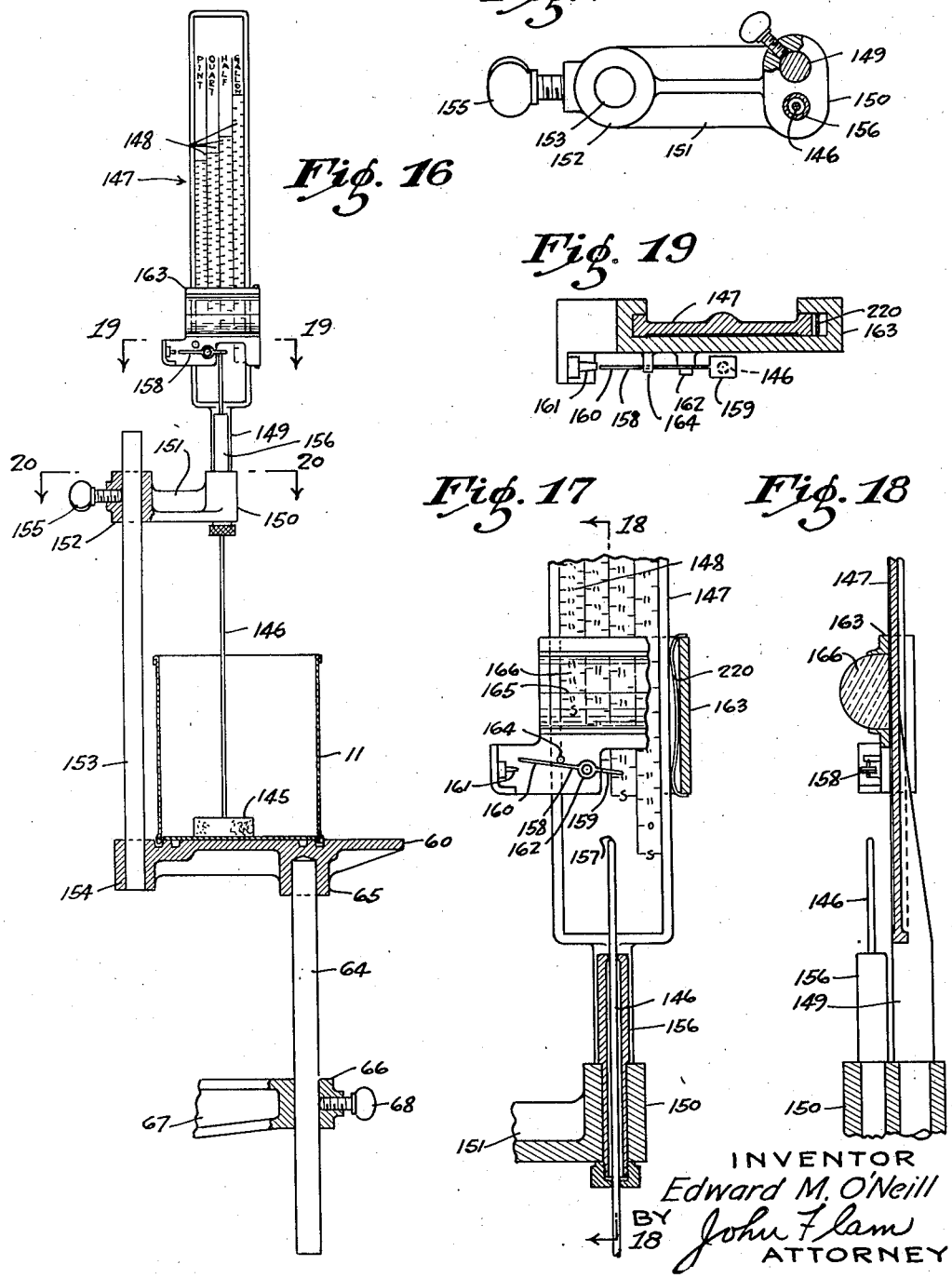
INVENTOR
Edward M. O'Neill
BY John Flam
ATTORNEY

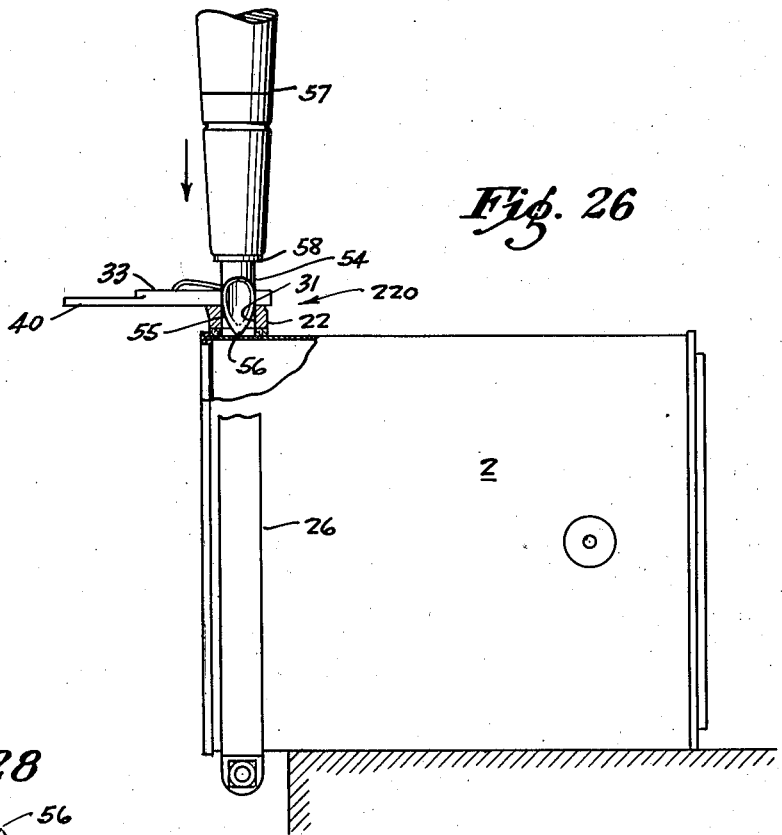
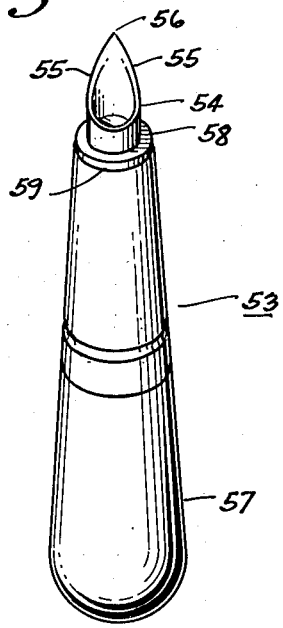
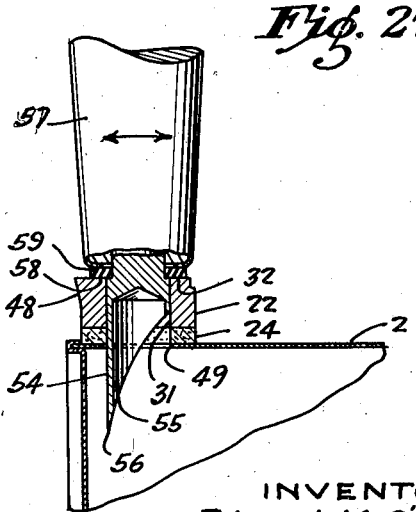

Patented Mar. 30, 1948

2,438,574

UNITED STATES PATENT OFFICE 2,438,574

MIXING APPARATUS

Edward M. O'Neill, San Francisco, Calif., assignor to Union Machine Company, San Francisco, Calif., a corporation of California Application August 24, 1942, Serial No. 455,833

1 Claim. (Cl. 259—67)

This invention relates to an apparatus for making mixtures; such for example as for mixing measured quantities of different colored paints, lacquers or the like to secure a predetermined color or tint. This application is a continuation in part of an application filed in the name of Edward M. O'Neill on October 16, 1939, Serial No. 299,677, and entitled "Mixing apparatus," now Patent No. 2,333,951, dated Nov. 9, 1943.

It is clear that to ensure availability of all such tints or color combinations in ready mixed form, it would be necessary to provide a very large stock. It is one of the objects of this invention to obviate the necessity of such a large stock, and especially by providing a mixing apparatus, in which any or all of a limited number of colors, which may be conveniently termed basic or ingredient colors, may be used in a wide variety of compositions. Thus with as few as fifteen basic colors, many thousands of tints or color combinations can be produced.

By the aid of this invention, the previously determined formula for each tint, prescribing use of some of the basic colors, may be readily followed. It is only necessary to use the specified proportion of each constituent color; and prepared tabulations may be used setting forth the proportional amount of each necessary constituent color to be included in the final mixture.

In general, the apparatus for performing the mixing operation may conveniently incorporate a table, supporting the cans in which the constituent colors are located, and having provisions for positioning any one of the cans at a discharging position, where a stationary mixing table is provided. The containers or cans should be capable of being readily removed and replaced in the apparatus, as well as to be readily controlled to discharge the desired amount of its paint or color. It is accordingly another object of this invention to provide a can or container structure that fulfills these requirements in a satisfactory manner.

In order to ensure uniformity in results, it is essential that the constituent colors be thoroughly agitated immediately prior to the mixing operation. It is still another object of this invention to provide an effective and reliable agitator mechanism and agitator drive, that is simple, inexpensive, and capable of rapidly and simultaneously agitating all of the colors.

This invention possesses many other advantages, and has other objects which may be made more easily apparent from a consideration of several embodiments of the invention. For this purpose there is shown a single form in the drawing accompanying and forming part of the present specification. This form will now be described in detail, illustrating the general principles of the invention; but it is to be understood that this detailed description is not to be taken in a limiting sense, since the scope of the invention is best defined by the appended claim.

Referring to the drawings:

Figs. 3 and 4 are fragmentary sectional views, taken along correspondingly numbered planes of Fig. 2;

Figs. 5 and 6 are detail sectional views, taken along correspondingly numbered planes of Fig. 2;

Fig. 7 is a detail sectional view, taken along plane 7—7 of Fig. 3;

Fig. 8 is a detail sectional view, taken along plane 8—8 of Fig. 2;

Fig. 9 is a sectional view, taken along plane 9—9 of Fig. 8;

Fig. 10 is an enlarged sectional view, taken along plane 10—10 of Fig. 9;

Fig. 11 is an elevational view, showing one of the color containers;

Fig. 12 is a sectional view taken along plane 12—12 of Fig. 11;

Fig. 13 is a fragmentary enlarged front elevation of the valve mechanism utilized in connection with the container illustrated in Fig. 11;

Fig. 14 is a sectional view, taken along the plane 14—14 of Fig. 13;

Fig. 15 is a sectional view taken along plane 15—15 of Fig. 13;

Fig. 16 is an elevational view, partly in section and on an enlarged scale, taken along plane 16—16 of Fig. 3;

Fig. 17 is a detail view of a portion of the apparatus of Fig. 16;

Fig. 18 is a section taken along plane 18—18 of Fig. 17;

Figs. 19 and 20 are detail sections as seen on correspondingly numbered planes of Fig. 16;

Fig. 21 is a diagram showing the assembly of a valve which may be used on the containers;

Fig. 23 is a detail section taken along plane 23—23 of Fig. 8;

Figs. 24 and 25 are sections on an enlarged scale, taken along correspondingly numbered planes of Fig. 23;

Fig. 26 is a view illustrating a step in the application of the valve structure to a color container;

Fig. 27 is a fragmentary view similar to Fig. 26, illustrating a further step; and Fig. 28 is a pictorial view illustrating a tool useful in carrying out the procedure of Figs. 26 and 27.

Figure 1:
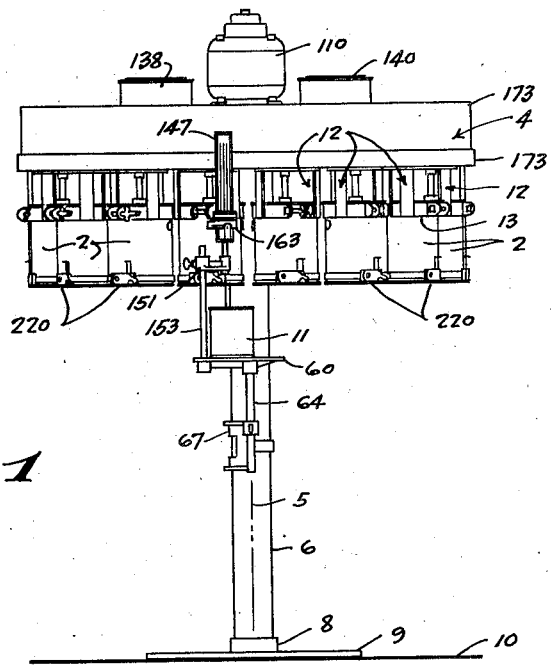
Figure 1 is an elevation of an apparatus incorporating the invention.
Figure 2:
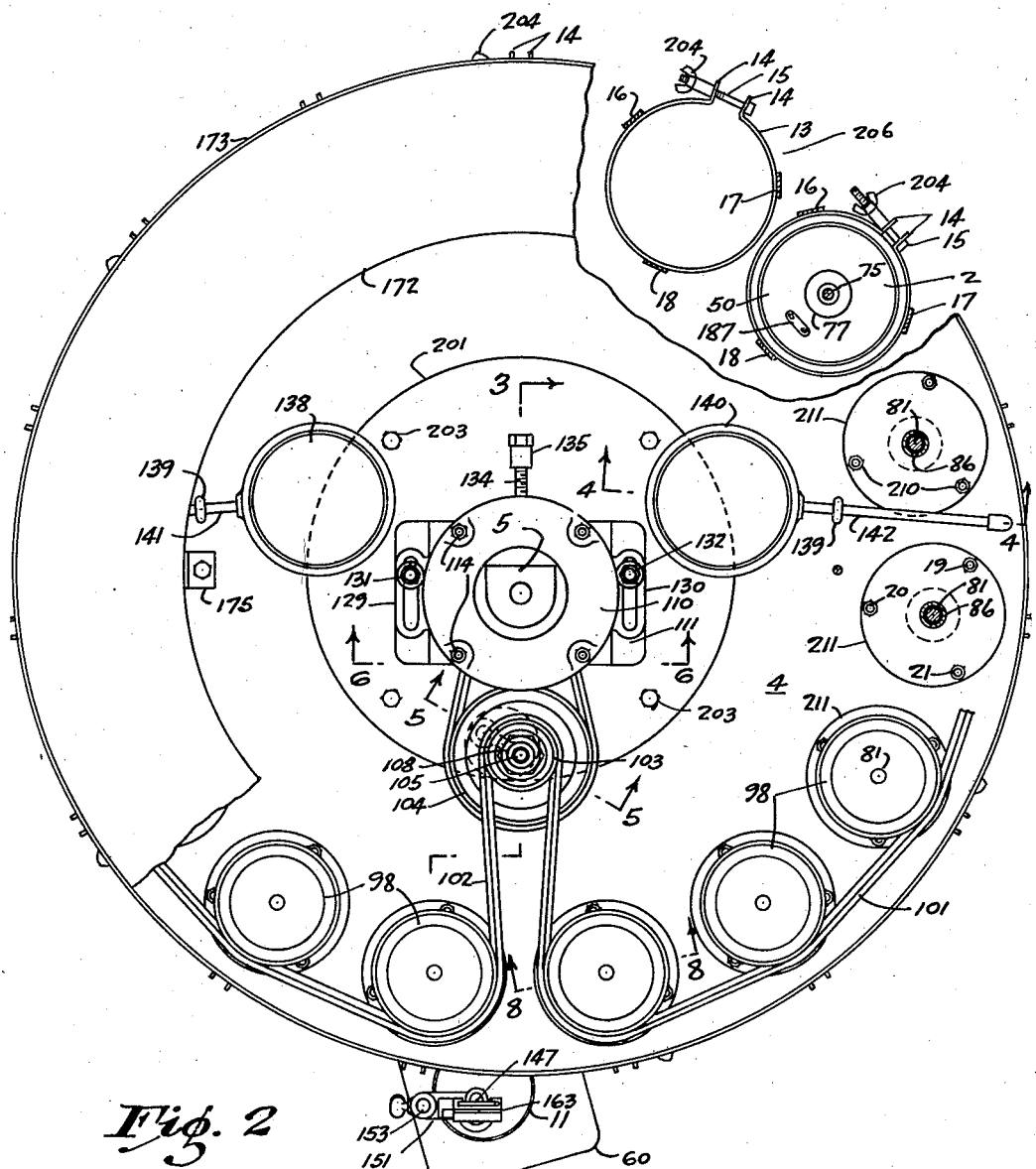
Fig. 2 is a top plan view of the apparatus shown in Fig. 1, a portion of the apparatus being broken away in order better to expose some of the elements thereof.

The apparatus as a whole is generally shown in Figs. 1, 2 and 3. In these figures, a flat table 4 is illustrated, and serves to support detachably a series of containers 2. Table 4 is rotatably supported; and is shown as circular. It may be formed of wood, metal or other suitable material; as shown it is formed of plywood reinforced with central metallic plates 201 and 202 disposed on its opposite faces, and secured thereon by bolts 203, which extend through the plates and the plywood. Table 4 is also provided with a circumferential metallic band 173 which extends above its upper surface to provide a shoulder for a purpose presently described.

A central sleeve 3, which may be conveniently a short piece of pipe is welded or otherwise secured to the underside of plate 202, which overlies and closes the upper end of the pipe or sleeve 3.

The table structure incorporating the parts 3 and 4, is arranged to be angularly adjustable about the axis 5 of a pedestal 6. This pedestal 6 extends upwardly into the sleeve 3 where it serves as a bearing for the sleeve. Pedestal 6 may be in the form of a hollow pipe, capped at its upper end by a cap member 7 having a convex top surface. The table structure 4 rests by gravity at its center, upon the cap 7; and the sleeve 3 has a running fit over the pedestal 6. In this way the table structure may be angularly adjusted manually or otherwise, as required in the use of the apparatus.

The pedestal 6, as shown most clearly in Fig. 1, may be supported in a base 8 having a wide flange 9 by the aid of which it may be secured to a supporting surface, such as a floor 10. Thus the entire apparatus may be conveniently located in a paint shop, or other place where it is desired to provide a definite mixture, incorporating liquid, such as paint from any one or more of the containers 2.

The arrangement is such that by rotation of the structure, any of the containers or cans 2 may be brought into a desired position for discharging an ingredient or constituent from the can. For this purpose the cans or containers 2, as shown most clearly in Fig. 2, are arranged in an annular manner about the axis 5 of rotation of the table structure. In the present instance provisions are made for fifteen containers 2 to be releasably supported by the table 1. These containers may be in the form of conventional paint cans, each one appropriately labeled with the number or name of the color constituent which it carries. Each of the cans or containers 2 is furthermore provided with valve means to permit discharging of the contents into any desired container or receptacle, such as illustrated at 11, Figs. 1, 2, 3 and 16. By angular adjustment of the position of the table, any one of the containers 2 may be brought in appropriate cooperating position with respect to the container or receptacle 11. The manner in which this container 11 is supported will be described hereinafter.

Each of the containers 2, as shown in Figs. 1, 2, 3, 8 and 11, is supported below table 4 by an appropriate hanger or bracket 12 secured to the table. As shown in Figs. 3, 8 and 9, each bracket 12 has a metal band 13 adapted to tightly embrace a container 2 adjacent the top thereof. The ends of band 13 may be provided with ears 14 through which a bolt 15 carrying a wing nut 204 passes. Band 13 is formed to a somewhat larger diameter than that of can 2. By tightening nut 204, the band 13 is clamped tightly about the can 2, an upper lip 205 on the can insuring against the can slipping downward within the band. When nut 24 is loosened, the natural resilience of the band causes it to spring open, as illustrated at 206 in Fig. 2, allowing ready removal of a can.

Each of bands 13 is hung beneath table 4 by arms 16, 17 and 18 which are secured to the table as by bolts 19, 20 and 21. Each arm 16, 17 or 18 has a projection or ear 206, 207 or 208 respectively for accommodating the bolt 19, 20 or 21 as the case may be, a circular metal plate 209 being interposed between the ears and the table. Bolts 19, 20 and 21 extend through table 4 being provided with nuts 210 at their upper ends. A circular metallic plate 211 is provided between the nuts and the table top.

To permit band 13 to be clamped about a container 2 or to be readily released therefrom, two of the hangers as 16 and 17, are permitted a limited transverse movement with respect to table 4. Referring to Figs. 9 and 10, it will be seen that bolt 19 does not clamp ear 206 against plate 209 but merely supports the ear on a washer 212 on the head of bolt 19, a separator 213 being interposed between washer 212 and plate 209 to provide clearance for ear 206. Ear 206 has a large hole 214 providing ample clearance about separator 213 to allow the necessary movement of ear 206 and hanger 16. A similar supporting arrangement is provided for ear 207.

As thus far described, it is apparent that the table structure 4 may be angularly adjusted to bring any one of the containers 2 into cooperative relation with can or receptacle 11 so as to enable the operator to permit the flow of liquid from the chosen container into the can 11. The control of the passage of liquid out of the containers 2 is provided by the aid of valve structures 220 located near the bottom of the containers. These valves may be best described in connection with Figs. 11 to 15.

Thus there is provided a valve body 22, which has an arcuate rear surface 23 conforming with the exterior surface of the container 2. Interposed between the body 22 and the container 2 may be a sealing gasket 24, such as of cork or the like. The body 22 may be held firmly in place near the bottom of the container 2 by the aid of the flexible clamping bands 25 and 26. These clamping bands are provided with loops such as indicated at 27, extending around the posts 28 formed integrally with the body member 22. The free ends of the bands 26 and 25 are each provided with ears 29 through which passes the tightening bolt 30. In this way the flexible bands 25 and 26 are held tightly in place, and the valve structure is thus secured to the can.

The body 22 is provided with a through port 31, placed in communication with the interior of the container 2, in a manner to be described. The outer face 32 of the valve body 22 is shown as being provided with the bosses 35 and 37, having flat surfaces. Port 31 extends through boss 35. Forming a closure for the port 31 is a gate or closure member 33. This gate 33, in the form of a metal plate, lying closely over the boss 35, is adapted to move in a direction transverse to the port 31, and is shown as provided with a lower knife edge 34. This knife edge 34 ensures that the discharge through the port 31 will be cut off sharply, as gate 33 moves downwardly past the port. Knife edge 34 also serves to scrape the surface of boss 35 clean as gate 33 closes, thus ensuring a tight joint between gate 33 and the surface of boss 35, preventing leakage. The lower edge of boss 35 is formed with converging surfaces, forming a point 48 to guide the flow of liquid in a more uniform stream. Closure member 33 is urged laterally against the boss 35 by resilient means in a manner to be hereinafter described. In this way it is ensured that a tight closure of the valve is secured.

Gate 33 is pivotally mounted on a stationary stud 36 threaded into the body 22, in the center of boss 37. Resilient means are provided for urging the gate 33 in a clockwise direction to the closed position illustrated in Fig. 13. This clockwise rotation, however, is limited by engagement of the end portion 38 of the knife edge 34 formed on the gate 33, with a stop 39 formed integrally with the body 22.

By referring to Fig. 15, it will be noted that stop 39 is provided with an inclined surface 51 adapted to be engaged by surface 38 when member 33 is in closed position. Thus, as gate 33 is urged downwardly to its closed position, it is also urged inwardly, or toward the left, into contact with the face of boss 35. This further ensures against leakage. This arrangement of the stop also guards against gate 33 being accidentally pulled away from the face of boss 35.

Gate 33 may also be provided with a finger piece or handle 40 for facilitating the raising of the gate 33 to open position. Furthermore, the body 22 may also be provided with a rest 41 integrally formed on the body 22, to accommodate the thumb of the operator when he desires to manipulate the closure member 33. In this way, the thumb serves to steady the container 2 during operation of the gate 33.

The resilient means for urging the closure 33 to the position of Fig. 13 may be in the form of a helical spring 42. One end of the spring is shown as anchored in a castle nut 43 threaded on the stud 36. The other end of the spring 42 acts upon the gate 33 adjacent the place where it is pivoted on the stud 36, urging the gate 33 tightly against the boss 37. By appropriate adjustment of the nut 43 the expansive force of the spring 42 may be varied. The nut 43 may be held in adjusted position as by the aid of cotter pin 44.

In order to urge the gate 33 against stop 39, the free end 45 of the spring 42 is shown as extended along the closure member 33, and is provided with an end 46 engaging in a recess 47 in the gate 33. The projection 46 thus serves to connect the gate 33 with the torsion spring 42. Adjustment of nut 43 also adjusts the torsion of the spring 42. The end 45 also operates as a leaf spring, exerting a transverse force on closure 33, to urge it strongly against boss 35.

By making the end portion or extension 45 of spring 42 so that the distance between the end 46 and the center of coil 42 when not attached to gate 33 is substantially greater than the distance between the center of stud 36 and recess 47, the spring may be caused to exert a substantial force on the end of gate 33 urging it against its seat on boss 35.

In Fig. 21, the dotted lines show this end portion 45 when free. It will be readily apparent that when end 46 is placed in recess 47, portion 45 will be flexed to about that position shown by the full lines. In that position consequently the spring will exert a substantial force on gate 33 as indicated by arrow 52 urging member 33 directly against boss 35.

This is an important feature, since otherwise with portion 45 of such length as to enter recess 47 without flexing, the force exerted by helical portion 42 urging gate 33 against boss 37 would be only slightly effective to urge the more remote portion of the gate against boss 35, and in the event of any irregularity in the faces of the bosses, might even tend to rock gate 33 away from boss 35.

The valve structure as just described may be very simply installed on any ordinary can, such as a paint can, even when the can is full. Thus the bands 25 and 26 may be encircled around the container 2 in such a place as to position the valve structure in the desired location. Then the bolt 30 can be tightened. The connection into the can 2 can then be provided by laying the container 2 on its side with the valve structure uppermost, as shown in Fig. 26, and forcing a piercing instrument through the port 31 to form the aperture 49 (Fig. 14) in the wall of the can. This piercing can be made with an awl-like instrument even when the can is filled with liquid, the unusual cover of the can being in place.

While this piercing operation may be performed with any convenient sharp pointed instrument, such piercing leaves a jagged hole which is undesirable, as it does not permit free flow of heavy material from the can. Since some of the tints are of this nature, a special tool 53, shown in Fig. 28, is provided which cuts out a piece of the container to form a smooth circular opening of the same size as port 31. As shown in Figs. 26 and 27, this tool has hollow cylindrical cutting blade 54, with a cutting edge 55 along its opposite surfaces meeting in a point 56. Blade 54 is secured in a suitable handle 57 for convenient manipulation, a shoulder 58 being provided at the base of blade 54. To guard against injury to face 32 of valve body 22, a washer 59 of suitable material as fibre is provided on shoulder 58.

With container 2 supported in a horizontal position with valve structure 220 uppermost (Fig. 26), gate 33 (Fig. 13) is swung upwardly far enough to clear stop 39. It is then pulled outwardly and allowed to swing downwardly past the stop 39. Blade 54 of tool 53 is then inserted in port 31 of the valve structure 22, and forced downwardly, point 56 piercing the wall of container 2, until shoulder 58 contacts the face 32 of the valve body. With the tool in this position, it is rotated, causing one or the other of cutting edges 54 to cut a circular piece the size of port 31 from the wall of the container, leaving a large smooth opening. Tool 53 is then removed and gate 33 returned to port closing position.

It is intended that the cover originally on the container be removed after the piercing or cutting operation and replaced with a similar cover 50 which however has a central packed opening 181 to accommodate the agitator shaft 75. This cover 50 is shown as of the usual paint can variety having surfaces cooperating with other surfaces on the container 2 to yieldingly hold the cover 50 in place.

It will be apparent that to permit ready withdrawal of the contents of the containers 2, means for admitting air to the containers must be provided. Thus each cover 50 may have a small port 186 (Figs. 23 and 25) for this purpose. To prevent deterioration of the contents a closure 187 is provided for each port 186. Closure 187 consists of a short bar 188 having a tapered plug 189 adapted to enter and close port 186. Bar 188 is pivotally secured to cover 50 by means of a screw 190 passing through the cover and engaged by a nut 191 on the under side of the cover. A spring 192 encircles screw 190 and urges member 187 axially of screw 190 toward cover 50. A handle 193 projects upwardly from bar 188 for convenient manipulation of member 187.

When it is desired to withdraw a portion of the contents of any container 2, the appropriate member 187 is pulled upwardly a sufficient distance to lift plug 189 free of port 186, and is then swung angularly a short distance about screw 190 when the member 189 may be released, plug 189 resting on cover 50. After the desired amount of the contents have been removed, member 187 is swung angularly about screw 190 until plug 189 registers with port 186 when spring 192 will force the plug into the port.

As thus far described, it is evident that by appropriate manipulation of the aparatus, liquid may be caused to be discharged from any selected container 2 into a can or container 11. There will now be described the supporting means for the container 11.

Referring in this connection to Figs. 1, 2, 3, 7 and 16, the container or receptacle 11 is shown as disposed upon a "mixing" table or platform 60. The container 11 may be of the conventional paint can type, and any desired size of paint can can be accommodated on the table 60.

The table 60 is shown as supported by the aid of a rod 64 which is pressed into a boss 65 formed integrally with the table 60. The rod 64 in turn is supported in a boss 66 formed at the free extremity of a bracket 67. The rod 64 is arranged to have a sliding fit within the boss 66, and may be held in any adjusted vertical position, as by the aid of a thumb screw 68.

The bracket 67, shown in this instance as of ribbed cast construction, is formed at its other extremity with a half socket 69 partially embracing the standard 6 (see Fig. 7). Cooperating with this half socket 69 is a clamping band 69. This clamping band is provided with a projection 70 passing through an aperture formed in the bracket 67. At its other end the band is provided with an ear 71. This ear 71 is in opposed relation to the ear 72 formed on the socket member 69 of the bracket 67. A clamping bolt 73 and thumb nut 74 are utilized for maintaining the bracket structure 67 tightly in place upon the standard 6.

Although the apparatus may be utilized in connection with any free-flowing materials, such as liquids, for facilitating making of mixtures in the container 11, one of its important uses is in the mixing of tints or colors in connection with lacquers, enamels and paints. When so utilized each of the containers 2 may be appropriately labeled or numbered to correspond with a definite standard color chart. In this way the desired container 2 can be moved to a position where the color or tint from that desired can may be passed into the container 11.

When used in connection with paints it is also quite important to ensure that the constituent or basic colors in the fifteen containers 2 be thoroughly stirred before being withdrawn and added to the mixture. For this purpose an agitator mechanism is provided.

Thus as shown most clearly in Figs. 3, 8 and 12, an agitator spindle 75 is associated with each can or container 2.

Preferably some packing for the spindle 75 is provided, to prevent entry of air to the container about the spindle and retard oxidation of the contents of the container.

Referring to Figs. 23 and 24, it will be noted that the opening 181 which permits passage of agitator shaft 75 through cover 50, provides a large clearance about the shaft 75, thereby eliminating any need for accurate alinement of container 2 and its supporting bracket 12 with respect to the bearing standard 86 and spindle 81. In order to seal about shaft 75, a floating cork gasket 76 is housed in a threaded ring 182, secured to cover 50 concentrically about opening 181. Ring 182 is substantially larger than gasket 76, whereby to accommodate the gasket for any position of shaft 75 within the clearance opening 181. A cap 77 threadedly engaging ring 182 serves to clamp gasket 76 in adjusted position after container 2 and agitator shaft 75 have been placed in the machine.

The agitator spindle 75 carries at its lower end the agitator paddle 79. This agitator paddle 79 may be formed of a flat metal bar having an intermediate portion 80 fitted into a slot in the end of the spindle 75. The bar 79 on opposite sides of the portion 80 may be bent in opposite directions, so that the broad surfaces of the paddle lie in planes oblique to the axis of spindle 75, as illustrated most clearly in Fig. 3. The portion 80 may be braced in place in the lower end of the spindle 75. The agitator bars 79 are arranged to be disposed adjacent the bottom of the respective containers 2. They are rotated by a power transmission which will now be described.

Each of the spindles 75 is provided with a driving pulley structure 98, shown to best advantage in Figs. 2, 3 and 8. The spindle 75 is shown as detachably connected to the lower end of its corresponding stem 81. The lower end of stem 81 for this purpose is provided with a central threaded aperture 82, within which the threaded end 83 of the spindle 75 may be accommodated. An enlarged recess 84 is provided in the bottom of the stem 81 within which the upper cylindrical portion of the spindle 75 may be accommodated. The shoulder formed at the top of spindle 75 around end 83 seats accurately in the bottom of the recess 84. To facilitate coupling and uncoupling of the spindle 75 from the stem 81, a through aperture 85 may be provided through the upper end of the spindle 75, for the accommodation of a pin to serve as a handle.

Thus, if desired, as for example for purposes of cleaning or filling or replacing any container, the spindle 75 may be disconnected from the stem 81, and then the container 2 with the spindle 75 may be removed as a unit from the table 4.

The stem 81 is journaled within a standard 86 (Fig. 8). This standard is shown as being provided with a lower, reduced portion 87, forming a shoulder 88. This shoulder 88 rests upon plate 211 on the top of the member 4. Standard 86 may be held tightly in place as by the aid of a nut 89, accommodated on the threaded portion 90 of the reduced portion 87.

Interposed between the stem 81 and the standard 86 are one or more bearing bushings 92, 93. These bushings may be made of self-lubricating material such as oilite. In order to keep these bushings properly saturated, oil may be supplied to them as through the oiling aperture 94. Oiling aperture 94 connects with an annular recess 96 in standard 86, surrounding the bushing 92.

Oil supplied through aperture 94 to the upper bushing 93 will percolate through the bushing into the annular space 95 formed by standard 86 about stem 81, and hence will pass to the lower bushing 92.

The upper end of stem 81 is arranged to be connected to the hub 97 of a driving pulley structure 98. For example, the radial headless set screw 99 may be used to form this driving connection. The pulley 98 may be conveniently formed of a light casting having a V-groove 100, for the accommodation of a wedge-shaped belt 101.

As shown most clearly in Fig. 2, a pulley structure 98 is associated with each of the agitator stems 81. The V-belt 101 serves to drive all of the pulley structures 98. For this purpose the V-belt 101 is shown as in driving contact with the outer edge of each of the pulley structures 98. The belt 101 makes a reverse bend, as indicated at 102, so as to pass around a driving pulley 103. This pulley is shown to best advantage in Fig. 5.

The driving pulley 103, due to the reverse bend 102, engages that side of the belt 101 which is out of engagement with the pulley structures 98. Accordingly, this outer surface of the belt 101 is also made wedge-shaped, providing a double V-belt arrangement. All of the agitator structures, for all of the containers 2, are driven in the same direction.

For driving the pulley 103 and thereby transmitting power to the stem 81, this pulley structure 103 is formed as one element of a step pulley. Another element of the step pulley is pulley structure 104, which is rotated by a source of power. These two pulley structures thus must rotate in unison. They are freely rotatable on a non-rotatable stub shaft 105. This hub of the stepped pulley structure may be provided with oilite bushings 106 adapted to be oiled through the apertures 107. This pulley structure may be restrained against upward axial movement with respect to the stub shaft 105, as by the aid of a collar or washer 108 held in place by spring snap ring 109. The manner in which the stub shaft 105 is supported will be explained hereinafter.

A source of power, such as a small vertical electric motor 110 (Figs. 1, 2, 3 and 6) may be belt connected to the pulley element 104. For supporting the motor 110, a bracket structure 111 is utilized, having four upright arms 112. At the top of each of these arms there is a boss 113 for the accommodation of the bolts 114 which pass through the end bell 115 and frame of the motor 110. Nuts 116 and 117 serve to maintain the motor 110 securely in place on top of the arms 112.

The motor shaft at its lower end, carries a V-pulley 118. This pulley is in driving relation with the pulley structure 104 as by the aid of the V-belt 119.

There is thus obtained a double reduction from the motor shaft to the agitator mechanism. One reduction is secured by the aid of the small driving pulley 118 on the motor shaft driving a comparatively large diameter driven pulley structure 104; and the small pulley structure 103, joined to pulley 104, drives the larger pulley structures 98. The paddles 79 are thus given a rate of rotation that is not too rapid, without the necessity of reduction gearing.

Provisions are made for tightening both of the belts 101 and 119 simultaneously. It is clear that if the axis of the stub shaft 105 be moved radially inwardly with respect to table 4, such a movement will serve to tighten the belt 101, while belt 119 would be loosened. But if at the same time the motor 110 is moved sufficiently in a direction upwardly as viewed in Fig. 2, the belt 119 may be nevertheless tightened. Both of these tightening movements can be obtained by providing a floating support for shaft 105 and by moving the motor 110 upwardly as viewed in Fig. 2.

For this purpose, the stub shaft 105 is shown as carried by a disk 122, as by being firmly fixed in a boss 120, formed integrally with the disk 122. The shaft 105 is held tightly in said boss 120, as by being riveted over at its end 121. Disk 122 is mounted for angular motion about an eccentric axis 123 parallel to, but spaced from the axis of the boss 120.

In order to provide the supporting axis 123, disk 122 is provided with another boss 124 which is rotatable on an enlarged journal portion 126 of a bolt 125. Bolt 125 extends downwardly through table 4 and is secured thereto by a nut 127. Another nut 128 and washer 129 serve to retain disk 122 on journal portion 126. It will be obvious that this enlarged portion 126 provides upper and lower shoulders 215 and 216, nut 127 cooperating with shoulder 216 to clamp bolt 125 to table 4, the upper shoulder 215 providing a stop for nut 128, washer 129 so that disk 122 is freely rotatable about axis 123.

As indicated most clearly in Fig. 2, and considering that the axis 123 is fixed, an upward movement of the motor 110 will serve simultaneously to move the stub shaft 105 angularly about the axis 123, in an upward direction. This movement of the motor 110 can be made sufficiently great to take the slack out of both of the belts 101 and 119, as hereinbefore described.

The manner in which the motor 110 may be moved for accomplishing this result is illustrated to best advantage in Figs. 2, 3 and 6. Thus the bracket 111 which supports the motor 110, is shown as provided with a pair of feet 129 and 130, resting on the top plate 201 of table member 4. These feet are slotted for the accommodation of bolts 131, 132, which pass through appropriate apertures in the table 4. These bolts are provided with the nuts 133, operating to clamp the feet 129, 130 to member 4. When the nuts, however, are loosened, the bracket 111 may be moved within the limits prescribed by the slots, as by the aid of an adjusting bolt 134 (Figs. 2 and 3). This adjusting bolt is journaled in a standard 135, fastened as by the aid of an integrally formed stud 136, to the top of the table member 4. The adjusting bolt 134 threadedly engages the threaded boss 137 formed integrally with the bracket 111.

Figure 4:
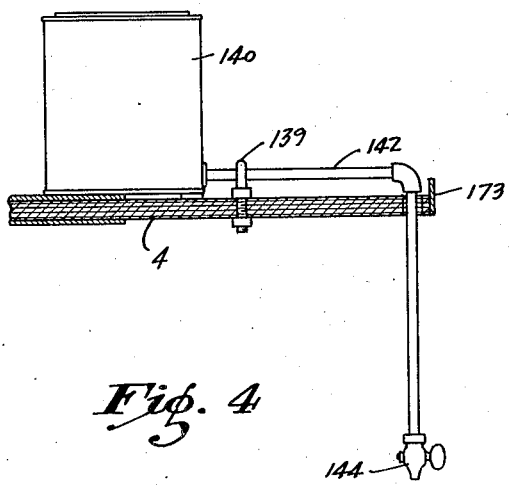

When the apparatus is used for mixing paints or lacquers or the like, it is advantageous to make it possible to pass either a paint or a lacquer thinner into the container 11, supplemental to the ingredients from containers 2. Accordingly tanks or cans are provided, appropriately supported on top of the table 4, for this purpose. Thus a container 138 (Figs. 1 and 2) which may contain a paint thinner or drier, may be supported on the table 4 as by the aid of clamp 139. A similar container 140 (Figs. 1, 2 and 4) for lacquer thinner may be supported on the other side of the center of the shelf member 4. Leading from these containers are the pipe conduits 141 and 142 which extend to opposite points of the edge of table 4. The conduits 141 and 142 thence extend downwardly through appropriately formed apertures in the table 4. At their lower extremities, they accommodate the manually operable plug valves 144. Thus these plug valves form outlet spouts extending downwardly in position to discharge the thinner into the container 11, when the table 4 is turned angularly to the proper position.

For guard purposes, the belt and pulley transmission may be covered as by the aid of a guard 172 (Figs. 1, 2 and 3). This guard 172 is in the form of a hollow annulus open at the bottom. It is telescoped within the upstanding flange 173 of the member 4, and the annular guard covers all of the pulley structures 98. It may be provided with appropriate apertures to permit the passage of the belt 101 to the pulley 103; as well as for the conduits 141 and 142 of the containers 138, 140. The guard 172 may be held in place as by the aid of one or more clips 175 (Fig. 2) fastened to the top of the table 4.

It is advantageous to make it possible to measure or somehow indicate or determine the amount of liquid discharged into receptacle 11 respectively from those containers 2 which carry the color or tint or other liquid to be included in the desired mixture. For this purpose a float gauge arrangement is utilized, shown to best advantage in Figs. 2, 3, 16–20, and shown and described in a copending application filed in the name of Edward M. O'Neill, on August 8, 1942, Serial No. 454,087, and entitled liquid level indicator, now Patent No. 2,399,291, dated April 30, 1946. By the aid of this arrangement the prescribed amount or proportion of the ingredients to be included in the mixture may be quite accurately gauged, and the delivery of the tint or the color or other liquid may be stopped as soon as the required amount is passed into the container 11.

Figure 22:
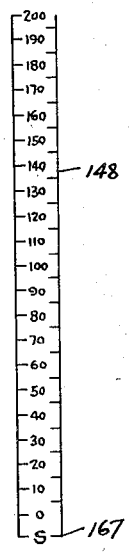
Fig. 22 is a diagram of a scale for the gauge used with the apparatus.

For this purpose, a float 145 having a stem 146 arranged to cooperate with a scale member 147 may be used (see Fig. 16). Scale member 147 may have a number of generally similar scales 148 one of which is shown in detail in Fig. 22, the indicia of each being proportioned for use with a particular size of receptacle 11. In the present instance there are shown four scales 148, corresponding respectively to receptacles of pint, quart, half gallon, and gallon respectively.

Scale member 147 is supported above receptacle 11 and in adjustably fixed relationship thereto by means of an extension 149 secured in a boss 150 formed on the end of bracket or arm 151. Bracket 151 has a boss 152 at its opposite end slidable on a rod 153 and secured in adjusted position thereon by a set screw 155. Rod 153 is secured to table 60 as by having a portion adjacent its lower end pressed in a boss 154 formed on table 60. Float stem 146 is accurately guided for vertical movement parallel with scale member 147, as by a tubular member 156 supported in boss 150 and through which stem 146 is freely slidable.

It will be apparent that the position of the upper extremity 157 of stem 146 with respect to any of scales 148 depends on the quantity of liquid in receptacle 11. Hence by choosing the appropriate scale for the capacity of the receptacle 11 being used, and adjusting scale member 147 in a vertical direction so as to bring the zero mark of the scale in alinement with end 157 of stem 146 when the receptacle is empty, the said end 157 will then indicate on the scale the amount or proportion of any liquids added to receptacle 11, and a predetermined formula for producing a given mixture may be readily followed.

However, in the production or reproduction of tints or colors by mixing a number of basic colors, a very accurate proportioning of the ingredients is necessary. It is not easy to accurately determine when the desired amount of liquid has been added to container 11 by noting the movement of the rod 146 relative to scale 148. Accordingly means are provided to amplify the movement of rod 146 and indicate a definite point in its travel relative to scale 148.

For this purpose a multiplying lever 158 is provided with its short end 159 arranged to be engaged by rod 146 and its long end 160 arranged to cooperate with a stationary pointer 161. Lever 158 is pivoted at 162 on an index carrying member 163 slidable on scale member 147. A leaf spring 230 is interposed between the edge of member 147 and the bottom of the slot on index 163, in which slot the scale member 147 is accommodated. The spring provides adequate friction to maintain member 163 at any set position, and also ensures accurate horizontal alinement of the index. The lever 158 is so weighted that the short end 159 overbalances the long end 160 and maintains it in a position above registry with pointer 161, and in contact with stop pin 164. Since index or pin 161 as well as the stop pin 164 are both carried by the slide 163, upon which lever 158 is mounted, setting of slide 163 also serves to determine the height at which stem 146 operates the pointer lever 158.

Rod 146 is disposed below end 159 of lever 158, so that upon sufficient upward movement of rod 146, end 157 thereof will contact end 159 and swing lever 158 in a counterclockwise direction, and into alinement with pointer 161. It will be apparent that a barely perceptible movement of rod 146 will produce a readily apparent movement of pointer end 160, and that, when this alines with pointer 161 an accurate indication of the liquid level in container 11 will be given. The end 159 is so short that even if rod 146 continues to move upwardly, the top 157 thereof will readily pass the end 159 after a small tilting movement of the lever 158.

To make it possible to position pointer 158 in desired relationship with any one of scales 148 movable member 163 is provided with an index or hair line 165, marked on the back of a magnifying cylindrical lens 166. This lens assists in accurately locating this index 165.

The apparatus is designed generally for facilitating the making of mixtures from specified ingredients; it is especially applicable to the mixing of paints, varnishes, lacquers, enamels, etc. The manner of use for this specific purpose may now be set forth.

For example, it has been difficult to match exactly the colors for automobile lacquer finishes unless a large stock of colors is kept. By appropriate choice of color ingredients in the fifteen containers 2, it is possible to match such colors very closely. The colors and the formulas required to produce them by the aid of any of the group of the fifteen constituents may be listed in a color table. Such a table may list the cars by name, color, and year; and associated with each of these, may be a table stating where the slide member 163 must be placed with the proper scale, in succession for each ingredient to be added.

The manner of setting the bracket 151 at the correct height along rod 153, prior to these measurements, may also be described. In this connection attention is directed to Figs. 16 and 22. First of all, the platform 60 is placed at a convenient height to correspond with the size of can 11, the top edge being set close under the valves 220 on containers 2. The float 145 is then dropped to the bottom of the empty can 11. The proper scale with regard to the size of can 11 is now chosen, and slide member 163 adjusted so that index 165 carried by the lens 166 alines with the "S" mark on scale 148 (see Fig. 22). This mark is indicated by 167 and is a short distance below the zero mark. The bracket 151 is now set so that the pointers 158 and 161 are alined. Clamp screw 155 is then tightened. Slide member 163 is now moved to the zero mark. The table 1 is now angularly moved until the petcock 144 for supplying thinner is directly over the can 11. The cock 144 is opened and enough thinner is passed into can 11 to bring pointers 158 and 161 once more into alinement. The operator is now ready to consult his color tables, setting thereafter the slide member 163 to agree with the tabulation for the first ingredient. This first ingredient is then run into the can, until pointers 158, 161 are again alined. To add the next ingredient, the slide member 163 is moved to the prescribed higher number on the scale, the ingredient added, and the operation is repeated, according to formula until the formula has been completed.

The thinner placed in receptacle 11 at the beginning of the mixing operation fulfills two purposes. First, it takes care of any inequalities in the bottom of the can 11 and gives an accurate base from which to start measurements. If the first color ingredient was placed directly in the bottom can 11, there would likely be sufficient inaccuracies to adversely affect the tint. Second, the ingredients being heavier than the thinner, as they are added they go through the thinner to the bottom, the thinner and float 145 remaining on top. Thus, the float is not fouled by the colors and at the end of the mixing need only be removed from the thinner and wiped in order to be perfectly clean and ready for future use.

Some care should be taken to position float 145 to one side of receptacle 11, so that the colors as they are added will not strike the float. Otherwise the float will be soiled and its operation disturbed.

What is claimed is:

In a mixing apparatus, a rotatable table, a plurality of containers suspended below the table, each of said containers having a discharge opening directed away from the axis of rotation of the table, an agitator in each container, each of said agitators having a rotary shaft, a coupling for each shaft, extending upwardly through the table, a pulley at a point above said table associated respectively with each coupling, and a motor carried by and above the table for simultaneously driving said pulleys.

EDWARD M. O'NEILL.

REFERENCES CITED

The following references are of record in the file of this patent:

UNITED STATES PATENTS

| Number | Name | Date |
|---|---|---|
| 811,482 | Case | Jan. 30, 1906 |
| 905,525 | Hanson | Dec. 1, 1908 |
| 1,231,499 | Crossley | June 26, 1917 |
| 1,327,351 | Morton | Jan. 6, 1920 |
| 1,502,465 | Garrett | June 22, 1924 |
| 1,633,470 | Ball | June 21, 1927 |
| 1,689,047 | Packer | Oct. 23, 1924 |
| 1,842,938 | Hancock | Jan. 26, 1932 |
| 1,937,385 | Hinkle | Nov. 28, 1933 |
| 1,967,891 | Lamoreaux | July 24, 1934 |
| 2,005,937 | Dennison | June 25, 1935 |
| 2,026,950 | Miller | Jan. 7, 1936 |
| 2,065,012 | Mulford | Dec. 22, 1936 |
| 2,094,702 | Hexter | Oct. 5, 1937 |
| 2,152,035 | Gettys | Mar. 28, 1939 |
| 2,172,593 | Prince et al. | Sept. 12, 1939 |